(12) United States Patent
Itou

(10) Patent No.: US 11,307,616 B2
(45) Date of Patent: Apr. 19, 2022

(54) DISPLAY DEVICE AND DISPLAY METHOD

(71) Applicant: NTT DOCOMO, INC., Tokyo (JP)

(72) Inventor: Takurou Itou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/652,085

(22) PCT Filed: Nov. 30, 2017

(86) PCT No.: PCT/JP2017/042963
§ 371 (c)(1),
(2) Date: Mar. 30, 2020

(87) PCT Pub. No.: WO2019/069475
PCT Pub. Date: Apr. 11, 2019

(65) Prior Publication Data
US 2020/0264666 A1 Aug. 20, 2020

(30) Foreign Application Priority Data
Oct. 4, 2017 (JP) .............................. JP2017-194623

(51) Int. Cl.
*G06F 1/16* (2006.01)
*G06F 3/0487* (2013.01)

(52) U.S. Cl.
CPC .......... *G06F 1/1647* (2013.01); *G06F 1/1616* (2013.01); *G06F 3/0487* (2013.01)

(58) Field of Classification Search
CPC ..... G06F 1/1647; G06F 1/1616; G06F 3/0487
See application file for complete search history.

(56) References Cited

U.S. PATENT DOCUMENTS 9,720,447 B2 * 8/2017 In-Sung ................ G06F 1/1643
9,864,410 B2 * 1/2018 La ......................... G06F 1/1677
(Continued)

FOREIGN PATENT DOCUMENTS

EP 3373112 A1 9/2018
JP 2012027562 A 2/2012
(Continued)

OTHER PUBLICATIONS

International Search Report issued in corresponding PCT Application No. PCT/JP2017/042963, dated Dec. 25, 2017, 3 pages.
(Continued)

*Primary Examiner* — David E Choi
(74) *Attorney, Agent, or Firm* — MKG, LLC

(57) ABSTRACT

A display device includes a main body degree of opening detecting unit that detects that a degree of opening of the main body is in a first style state that satisfies a style condition. A main body tilt detecting unit detects that a tilt of the main body is in a second style state that satisfies a style condition. A dual-screen display control unit, in response to detection that a degree of opening of the main body is in a first style state, and to detection that a tilt of the main body is in a second style state, causes an app image for a first app associated with the style states to appear on a first screen, and causes an app image for a second app associated with the style states to appear on a second screen. A style-based processing execution unit performs processing associated with the style states by use of the apps.

22 Claims, 10 Drawing Sheets

(56) References Cited

U.S. PATENT DOCUMENTS

| | | | |
|---|---|---|---|
| 10,235,119 B2* | 3/2019 | Choi .................... | G06F 3/1423 |
| 10,437,414 B2* | 10/2019 | Kang ................... | G06F 3/04842 |
| 10,534,534 B2* | 1/2020 | Cheong ................ | G06F 3/0481 |
| 2012/0023437 A1 | 1/2012 | Moriwaki | |
| 2012/0229374 A1 | 9/2012 | Kobayashi et al. | |
| 2015/0309691 A1* | 10/2015 | Seo ...................... | G06F 3/0484 |
| | | | 345/173 |
| 2017/0229100 A1* | 8/2017 | Chun .................... | G06F 1/1647 |
| 2017/0357292 A1* | 12/2017 | Cho ..................... | G06F 1/1616 |
| 2018/0004251 A1* | 1/2018 | Magi .................... | G06F 1/1626 |
| 2018/0039408 A1* | 2/2018 | Cheong ................ | G06F 1/1677 |
| 2020/0264666 A1* | 8/2020 | Itou ..................... | G06F 3/0487 |

FOREIGN PATENT DOCUMENTS

| | | | |
|---|---|---|---|
| JP | 2012190297 A | 10/2012 | |
| JP | 2014107714 A1 | 9/2014 | |
| JP | 2016184436 A | 10/2016 | |
| WO | 2017078366 A1 | 5/2017 | |

OTHER PUBLICATIONS

Notice of Reasons for Refusal for Japanese Patent Application No. 2017-194623, dated Nov. 30, 2018, 8 pages.

Extended European Search Report issued in corresponding European Patent Application No. 17927994.8, dated Oct. 23, 2020, 7 pages.

Communication issued in corresponding European Patent Application No. 17927994.8, dated Dec. 21, 2021.

* cited by examiner

| STYLE | FIRST STYLE STATE (MAIN BODY DEGREE OF OPENING = HINGE ANGLE) | SECOND STYPE STATE (MAIN BODY TILT = REFERENCE DIRECTIONS A1, A2) |
|---|---|---|
| FULLY OPEN STYLE | 180 DEGREES | NO CONDITION |
| FULLY CLOSED STYLE | 0 DEGREE | NO CONDITION |
| NOTEBOOK PC STYLE | 220-260 DEGREES | A1: VERTICALLY UPWARD DIRECTION (MARGIN:0 to 10 DEGREES) A2: HORIZONTAL DIRECTION (MARGIN:PLUS OR MINUS 10 DEGREES) |
| TENT STYLE | 50-70 DEGREES | A1: HORIZONTAL DIRECTION (MARGIN:PLUS 20 TO 40 DEGREES) A2: HORIZONTAL DIRECTION (MARGIN:PLUS OR MINUS 10 DEGREES) |
| VERTICAL STYLE | 45-135 DEGREES | A1: HORIZONTAL DIRECTION (MARGIN:PLUS OR MINUS 10 DEGREES) A2: VERTICALLY UPWARD DIRECTION (MARGIN:0 to 10 DEGREES) |

FIG. 5

| STYLE | FIRST APP | SECOND APP |
|---|---|---|
| FULLY OPEN STYLE | BOOK READING APP | NONE |
| FULLY CLOSED STYLE | SNS APP | NONE |
| NOTEBOOK PC STYLE | WORD-PROCESSING APP | KEYBOARD APP |
| TENT STYLE | VIDEO REPLAY APP | VIDEO REPLAY APP |
| VERTICAL SYTLE | SWING SHOOTING APP | NONE |

FIG. 6

| STYLE | FIRST APP PROCESSING | SECOND APP PROCESSING |
|---|---|---|
| FULLY OPEN STYLE | DOUBLE-SCREEN FULL DISPLAY | NONE |
| FULLY CLOSED STYLE | NONE | NONE |
| NOTEBOOK PC STYLE | NONE | NONE |
| TENT STYLE | REPLAY START | REPLAY START |
| VERTICAL SYTLE | SHOOTING START | MEASUREMENT START |

FIG. 7

| STYLE | DISPLAYED APP | TO-BE-DISPLAYED APP |
|---|---|---|
| FULLY OPEN STYLE | TELEPHONE DIRECTORY APP | TELEPHONE APP |
| NOTEBOOK PC STYLE | MUSIC PERFORMANCE APP | MUSIC SCORE DISPLAY APP |

*FIG. 9*

| STYLE | TIME PERIOD | FIRST APP | SECOND APP |
|---|---|---|---|
| FULLY OPEN STYLE | BREAKFAST TIME | NEWSPAPER VIEWING APP | WEATHER FORECAST APP |
| | PRE-DINNER TIME | STORE SEARCH APP | MAP APP |
| TENT STYLE | BREAKFAST TIME | TV APP | TV APP |
| | WEEKEND DAYTIME | STREAMING-VIDEO VIEWING APP | STREAMING-VIDEO VIEWING APP |

FIG. 10

| STYLE | CURRENT POSITION | FIRST APP | SECOND APP |
|---|---|---|---|
| FULLY OPEN STYLE | DOWNTOWN AREA | STORE SEARCH APP | MAP APP |
| FULLY OPEN STYLE | MOUNTAIN TRAIL | MOUNTAIN TRAIL MAPP APP | MOUNTAIN WEATHER APP |
| TENT STYLE | OFFICE | NOTE APP | PRESENTATION APP |
| TENT STYLE | HOME | MOVIE REPLAY APP | MOVIE REPLAY APP |

FIG. 11

DISPLAY DEVICE AND DISPLAY METHOD

TECHNICAL FIELD

The present invention relates to a user interface technology.

BACKGROUND

JP 2012-27562 A1 discloses a technique for causing a multi-monitor, when application programs are running, to present display areas in an optimized layout.

SUMMARY OF INVENTION

A user of a dual-screen foldable display device can change a degree of opening of the main body to, for example, a closed state or a fully open state, and use an application suitable to the changed degree of opening. For convenience, an application should be usable quickly upon changing of a degree of opening of the main body.

The present invention enables a dual-screen foldable display device to make a particular application usable quickly.

The present invention provides a display device comprising: a main body including a first body including a first screen, a second body including a second screen, and a connecting part that connects the first body and the second body such that the main body can be folded; a detection unit configured to detect at least that a degree of opening of the main body is in a first state; and a display control unit configured, in response to detection that a degree of opening of the main body is in the first state, to cause an image for a first application associated with the first state to appear on the first screen.

The detection unit may be further configured to detect that a tilt of the main body is in a second state, and the display control unit may be configured, in response to detection that a degree of opening of the main body is in the first state, and to detection that a tilt of the main body is in the second state, to cause an image for an application associated with the first and second states to appear on the first screen, as the image for the first application.

The display device may further comprise an execution unit configured, in response to detection that a degree of opening of the main body is in the first state, and to display of the image for the first application, to perform processing associated with the first state by use of the first application.

The display control unit may be further configured, in response to detection that a degree of opening of the main body is in the first state, to cause an image for a second application associated with the first state to appear on the second screen.

The display control unit may be configured, in response to detection that a degree of opening of the main body is in the first state while the second screen shows an image for an application, to cause an image for an application associated with the first state and with the application shown on the second screen, to appear on the first screen, as the image for the first application.

The display control unit may be configured, in response to detection that a degree of opening of the main body is in the first state, to cause an image for an application associated with the first state and with a time period including a current time, to appear on the first screen, as the image for the first application.

The display device may further comprise a measurement unit configured to measure a position of the display device, and the display control unit may be configured, in response to detection that a degree of opening of the main body is in the first state, to cause an image for an application associated with the first state and with a measured position, to appear on the first screen, as the image for the first application.

The present invention provides a display method for a display device whose main body includes a first body including a first screen, a second body including a second screen, and a connecting part that connects the first body and the second body such that the main body can be folded, the display method comprising: detecting at least that a degree of opening of the main body is in a first state; and in response to detection that a degree of opening of the main body is in the first state, causing an image for a first application associated with the first state to appear on the first screen.

The present invention enables a dual-screen foldable display device to make an application available quickly.

BRIEF DESCRIPTION OF THE DRAWINGS

FIG. 5 is a diagram showing an example of a style condition table, in accordance to the present invention.

FIG. 6 is a diagram showing an example of an application-to-display table, in accordance to the present invention.

FIG. 7 is a diagram showing an example of an application processing table, in accordance to the present invention.

FIG. 9 is a diagram showing an example of an application-to-display table according to a modification of the present invention.

FIG. 10 is a diagram showing an example of an application-to-display table according to a modification of the present invention.

FIG. 11 is a diagram showing an example of an application-to-display table according to a modification of the present invention.

Figure 1:
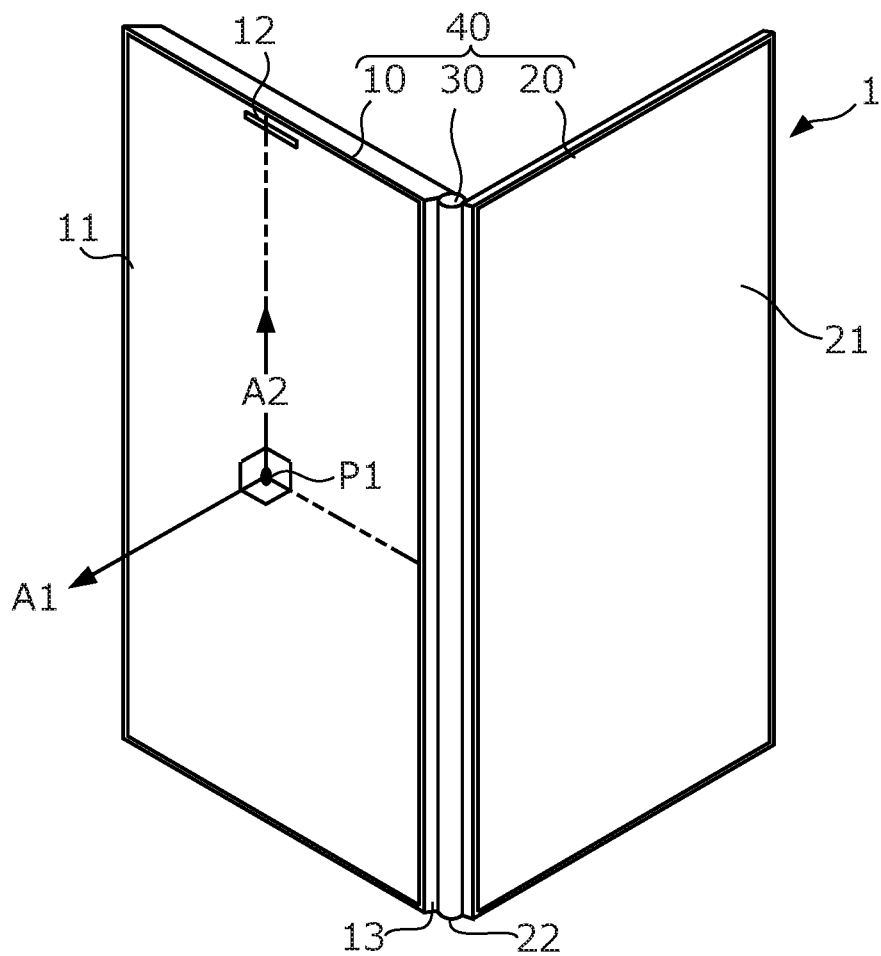
FIG. 1 is a diagram showing an appearance of a smartphone according to an embodiment of the present invention.

REFERENCE NUMERALS LIST 1 smartphone
10 first body
11 first screen
20 second body
21 second screen
30 hinge
100 style condition detecting unit
101 main body degree of opening detecting unit
102 main body tilt detecting unit
200 dual-screen display control unit
201 first display control unit
202 second display control unit
300 style-based processing execution unit

DETAILED DESCRIPTION

FIG. 1 shows an appearance of smartphone 1 according to an embodiment. Smartphone 1 includes main body 40, which includes first body 10, second body 20, and hinge 30. Each of first body 10 and second body 20 is a rectangular-plate-shaped body. First body 10 includes rectangular-shaped first screen 11, and second body 20 includes rectangular-shaped second screen 21. First screen 11 includes speaker opening 12 from which phone sound is output. First screen 11 and second screen 21 are provided in different bodies so that the screens are physically separated.

Each of first body 10 and first screen 11 is an example of a "first body" and a "first screen" according to the present invention. Each of second body 20 and second screen 21 is an example of a "second body" and a "second screen" according to the present invention. It is of note that the terms "first" and "second" are used for convenience of explanation, and the above correspondence relation is merely an example. For example, the body including speaker opening 12 may be interpreted as an example of a "second body" according to the present invention, and the other body may be interpreted as an example of a "first body" according to the present invention.

Hinge 30 connects first body 10 with second body 20 so that they can rotate. Hinge 30 includes a first rotating member and a second rotating member, each of which can rotate about a rotation axis. The first rotating member is a member at which edge 13 on the long side of first screen 11 of first body 10 is fixed. The second rotating member is a member at which edge 22 on the long side of second screen 21 of second body 20 is fixed.

As hinge 30 rotates, an angle formed by first screen 11 and second screen 21 (hereinafter referred to as "hinge angle") changes from 0 degree (a closed state) through 180 degrees (an open state) to 360 degrees (a back-to-back closed state). In smartphone 1, when a hinge angle is 0 degree so that main body 40 is closed, first screen 11 and second screen 21 face outward. When a hinge angle is 360 degrees so that main body 40 is in the back-to-back closed state, first screen 11 and second screen 21 face inward.

Each of first body 10 and second body 20 has a plate shape; therefore, a hinge angle is equivalent to an angle formed by first body 10 and second body 20. A hinge angle is a value indicating a degree of opening of main body 40, namely, a degree of opening between first body 10 and second body 20. A change of a hinge angle from 180 degrees to 0 degree or 360 degrees causes first body 10 and second body 20 to face each other. Hinge 30 connects first body 10 and second body 20 such that main body 40 can be folded. Hinge 30 is an example of a "connecting part" of the present invention.

Figure 2:
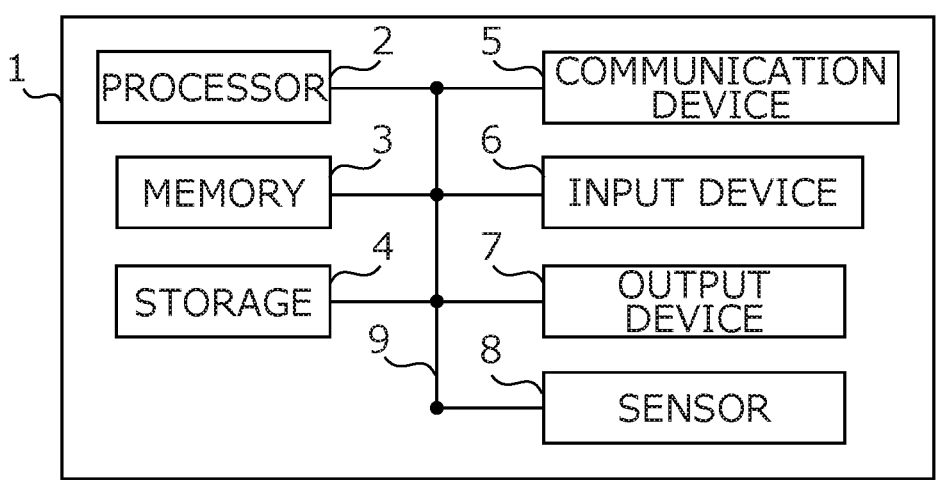
FIG. 2 is a diagram showing a hardware configuration of the smartphone, in accordance to the present invention.

FIG. 2 shows a hardware configuration of smartphone 1, which is a computer including processor 2, memory 3, storage 4, communication device 5, input device 6, output device 7, sensors 8, and bus 9. Most of the devices are housed inside main body 40; though some of them have a part exposed to the outside, such as a screen. It is of note that the term "device" may be read as a circuit or a unit. It is also of note that there may be one or more of each of the devices, and some of the devices may not be included.

Processor 2 controls a computer, for example, by causing an operating system to run. Processor 2 may include a central processing unit (CPU) that includes interfaces for connection to peripheral devices, a control device, an arithmetic device, and a register. Processor 2 retrieves programs (program codes) including an operating system (OS) and various applications (hereafter, also simply referred to as "apps"), software modules, and data from storage 4 and/or communication device 5 to memory 3, and performs various processing based on them.

Processor 2 executes, as an application, a browser, a social networking service (SNS) app, an email app, a telephone app, a telephone directory app, a map app, a video replay app, a book viewing app, a document creation app, and a camera app, for example. The number of processors 2 for performing a variety of processing may be one or more, and two or more processors 2 may perform a variety of processing simultaneously or sequentially. Processor 2 may be composed of one or more chips. The programs may be transmitted from a network via a telecommunication line.

Memory 3 is a computer-readable recording medium, and may include at least one of a read only memory (ROM), an erasable programmable ROM (EPROM), an electrically erasable programmable ROM (EEPROM), and a random access memory (RAM). Memory 3 may be referred to as a register, a cache, or a main memory (a main storage device). Memory 3 can store the programs (program codes), the software modules, and the data.

Storage 4 is a computer-readable recording medium, and may include at least one of a hard disk drive, a flexible disk, a flash memory (for example, a card, a stick, a key drive), and a magnetic strip. Storage 4 may be referred to as an auxiliary storage device. The recording medium may refer to a database including memory 3 and/or storage 4, a server, or any other suitable medium.

Communication device 5 is hardware (a transmission/reception device) for enabling communication between computers via a wired and/or wireless network, and is also referred to as, for example, a network device, a network controller, a network card, or a communication module. Input device 6 is an input device for receiving input, such as a microphone, a switch, a button, or a sensor. Output device 7 is a device for performing output, such as a display, a speaker, or an LED lamp. In smartphone 1, input device 6 and output device 7 together constitute a touch screen.

Sensors 8 include various sensors. Sensors 8 include, for example, a strain sensor provided at hinge 30, as a sensor for measuring a hinge angle indicative of a degree of opening of main body 40. This strain sensor measures a higher strain in proportion to an increased hinge angle.

Sensors 8 also include, for example, a three-axis magnetic sensor as a sensor for measuring a tilt of main body 40. A tilt of main body 40 is represented by six angles formed by each of two reference directions, and each of a vertical direction, a north-south direction, and an east-west direction. The three-axis magnetic sensor measures a value indicative of six angles. In the present embodiment, two reference directions are defined: one is reference direction A1, which is a direction of a normal line extending from center P1 of first screen 11 shown in FIG. 1, while the other is reference direction A2, which is a direction extending from center P1 along the longer side of first screen 11 toward speaker opening 12.

It is of note that sensors 8 may include, instead of the strain sensor and the magnetic sensor, any sensor(s) capable of outputting values indicative of a degree of opening and a tilt of main body 40. The devices such as processor 2 and memory 3 can access each other via bus 9 that enables communication. The bus 9 may be a single bus, or may include plural buses that connect the devices.

It is also of note that smartphone 1 may include hardware such as a microprocessor, a digital signal processor (DSP), an application specific integrated circuit (ASIC), a programmable logic device (PLD), or a field programmable gate array (FPGA). The hardware may provide some or all of the functional blocks. For example, processor 2 may be composed of at least one of the items of the hardware.

Smartphone 1 can be folded and can display images on two screens; therefore, smartphone 1 may be used at a different degree of opening of main body 40, which is a degree of opening of first body 10 and second body 20, represented by a hinge angle, and at a tilt of main body 40, which is represented by reference direction A1 in the present embodiment. A frequently used combination of a degree of opening and a tilt of main body 40 will be referred to as "style."

Figure 3:
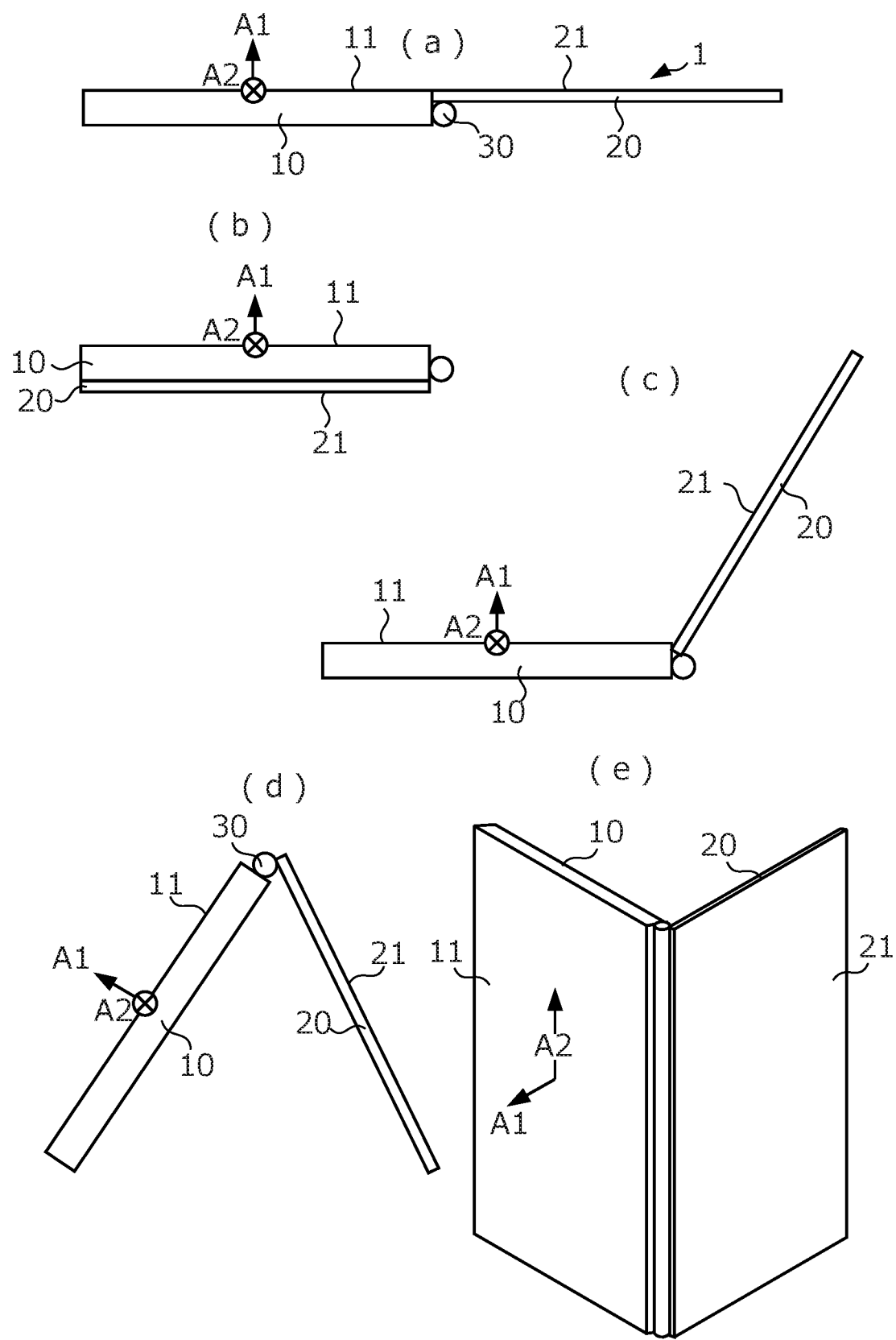
FIGS. 3 (a)-(e) are diagrams showing examples of styles of the smartphone, in accordance to the present invention.

FIG. 3 shows examples of a style of smartphone 1. FIGS. 3(*a*) to 3(*d*) show smartphone 1 viewed along the longitudinal direction of hinge 30. FIG. 3(*a*) shows a state in which a degree of opening (a hinge angle) of main body 40 is 180 degrees, which state hereafter will be referred to as "fully open style." In the fully open style, first screen 11 and second screen 21 are arranged in a straight line (in other words, they are arranged in the same plane), so that they form a single large screen. A state in which a degree of opening of main body 40 is 180 degrees refers to the fully open style regardless of a tilt of main body 40.

FIG. 3(*b*) shows a state in which a degree of opening of main body 40 is 0 degree, which state hereafter will be referred to as "fully closed style." The state refers to the fully closed style regardless of a tilt of main body 40. FIG. 3(*c*) shows a state in which a degree of opening of main body 40 is about 240 degrees, reference direction A1 indicative of a tilt of main body 40 is directed vertically upward, and reference direction A2 is directed horizontally. This state hereafter will be referred to as "notebook personal computer (PC) style" since it resembles the state of a notebook PC in use.

The notebook PC style allows for some variation (for example, plus or minus 20 degrees) in a degree of opening of main body 40, and allows for some variation (for example, plus or minus 10 degrees) in a tilt of main body 40. FIG. 3(*d*) shows a state in which a degree of opening of main body 40 is about 60 degrees (plus or minus 10 degrees is allowed), reference direction A1 indicative of a tilt of main body 40 is directed vertically upward by 30 degrees (plus or minus 10 degrees is allowed) relative to the horizontal direction, and reference direction A2 is directed horizontally (plus or minus 10 degrees is allowed). This state hereafter will be referred to as "tent style" since it resembles the shape of a tent.

FIG. 3(*e*) shows smartphone 1 as viewed obliquely from above. The figure shows a state in which a degree of opening of main body 40 is about 90 degrees (plus or minus 45 degrees is allowed), reference direction A2 is directed horizontally (plus or minus 10 degrees is allowed), reference direction A1 indicative of a tilt of main body 40 is directed vertically upward or downward (plus or minus 10 degrees is allowed). This state hereafter will be referred to as "vertical style."

Processor 2 of smartphone 1, by executing a program to control the components of smartphone 1, provides functions described below.

Figure 4:
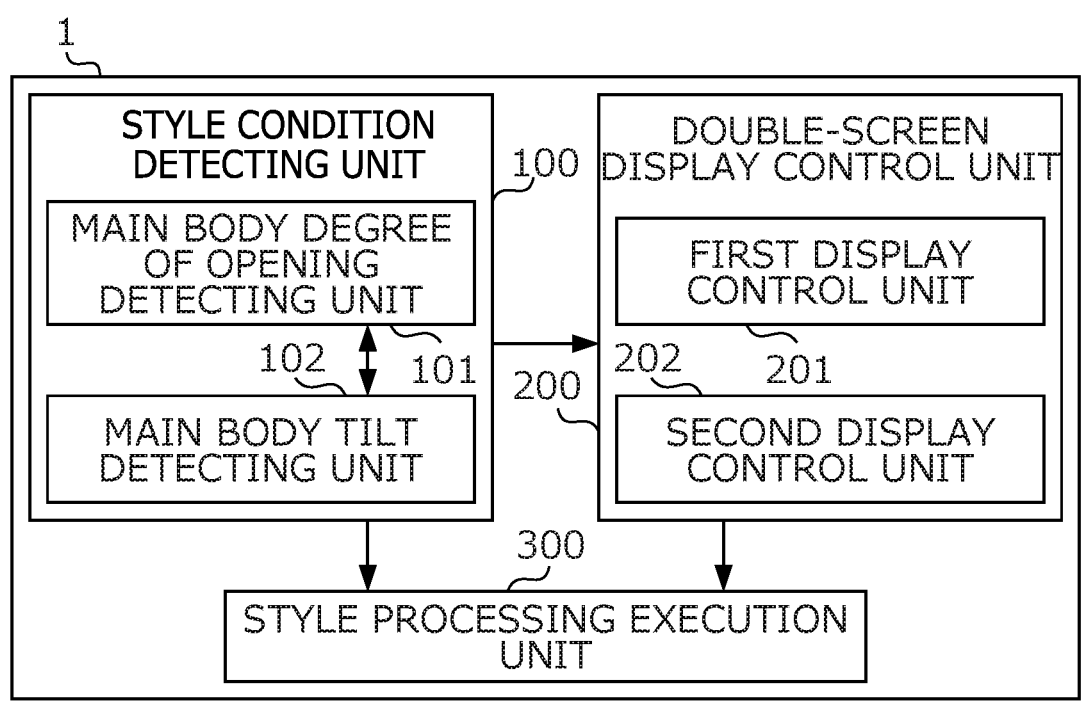
FIG. 4 is a diagram showing a configuration of functions provided by the smartphone, in accordance to the present invention.

FIG. 4 shows a configuration of functions provided by smartphone 1. Smartphone 1 includes style condition detecting unit 100, which is an example of a "detection unit" of the present invention, dual-screen display control unit 200, which is an example of a "display control unit" of the present invention, and style-based processing execution unit 300, which is an example of an "execution unit" of the present invention.

Style condition detecting unit 100 detects that a degree of opening and a tilt of main body 40 of smartphone 1 satisfy a style condition. The style condition refers to conditions of a degree of opening and a tilt of main body 40, satisfaction of which leads to a determination of one of the styles shown in FIG. 3. Style condition detecting unit 100 includes main body degree of opening detecting unit 101 and main body tilt detecting unit 102.

Main body degree of opening detecting unit 101 detects that a degree of opening of main body 40 is in a first style state that satisfies a style condition. Main body tilt detecting unit 102 detects that a tilt of main body 40 is in a second style state that satisfies a style condition. The first style state is an example of a "first state" of the present invention, and the second style state is an example of a "second state" of the present invention.

Style condition detecting unit 100 stores a style condition table in which a style is associated with a first style state and a second style state.

FIG. 5 shows an example of the style condition table, in which the "fully open style" is associated with a first style state "180 degrees" and a second style state "no condition," and the "fully closed style" is associated with a first style state "0 degree" and a second style state "no condition."

The "notebook PC style" is associated with a first style state "220 to 260 degrees" and a second style state "A1: vertically upward direction having a margin of 0 to 10 degrees, A2: horizontal direction having a margin of plus or minus 10 degrees." The margin of plural or minus 10 degrees ranges from plus 10 degrees vertically upward relative to the horizontal direction to minus 10 degrees vertically downward relative to the horizontal direction. The "tent style" is associated with a first style state "50 to 70 degrees" and a second style state "A1: horizontal direction having a margin of plus 20 to 40 degrees, A2: horizontal direction having a margin of plus or minus 10 degrees." The "vertical style" is associated with a first style state "45 to 135 degrees" and a second style state "A1: horizontal direction having a margin of plus or minus 10 degrees, A2: vertical direction having a margin of 0 to 10 degrees."

Main body degree of opening detecting unit 101, when sensors 8 measure a hinge angle of any one of 0 degree, an angle from 45 to 135 degrees, 180 degrees, and an angle from 220 to 260 degrees, detects that a degree of opening of main body 40 is in a first style state. Upon detecting a first style state, main body degree of opening detecting unit 101 notifies main body tilt detecting unit 102 of a style corresponding to the detected first style state.

Main body tilt detecting unit 102, when six angles formed by reference directions A1 and A2 measured by sensors 8 are included in a range of a second style state associated with a notified style, detects that a tilt of main body 40 is in a second style state. For example, in a case where main body tilt detecting unit 102 is notified of the notebook PC style, main body tilt detecting unit 102, upon determining that reference direction A1 forms an angle of 0 to 10 degrees with the vertically upward direction, and reference direction A2 forms an angle of plus or minus 10 degrees with the horizontal direction, detects that a tilt of main body 40 is in a second style state.

A second style state is detected only after a first style state is detected. A combination of a detected first style state and a detected second style state indicates a style of smartphone 1. Style condition detecting unit 100 outputs detection results of main body degree of opening detecting unit 101 and main body tilt detecting unit 102 to dual-screen display control unit 200 and style-based processing execution unit 300.

Dual-screen display control unit 200 causes app images to appear on first screen 11 and second screen 21. The app images are prepared for display on a screen while an app is running. Dual-screen display control unit 200 includes first display control unit 201 and second display control unit 202. First display control unit 201 causes an app image to appear on first screen 11, and second display control unit 202 causes an app image to appear on second screen 21.

Dual-screen display control unit 200 stores an application-to-display table in which a style is associated with a first app whose image is displayed on first screen 11 and a second app whose image is displayed on second screen 21.

FIG. 6 shows an example of the application-to-display table, in which the "fully open style" is associated with a first app "book viewing app" and a second app "none." The second app "none" means that no application is displayed.

The "fully closed style" is associated with a first app "SNS app" and a second app "none." The "notebook PC style" is associated with a first app "document creation app" and a second app "keyboard app." The "tent style" is associated with a first app "movie replay app" and a second app "movie replay app." The "vertical style" is associated with a first app "swing shooting app" and a second app "none."

First display control unit 201, upon determining that a detection result output from style condition detecting unit 100 indicates the fully open style, causes an app image for a first app (namely, the book viewing app) associated with the fully open style to appear on first screen 11. When doing so, upon detecting that the book viewing app is not running, first display control unit 201 launches the app to cause the app image to appear on first screen 11.

It is of note that smartphone 1 can temporarily store an app image for an app running in the background. In a case where the book viewing app is running in the background, first display control unit 201 retrieves the temporarily stored app image to cause the image or an updated image to appear on first screen 11, instead of launching the app.

The fully open style is not associated with a second app; accordingly, second display control unit 202 performs no operation. A first style state indicative of a style by itself is associated with information (for example, an app shown in FIG. 6) associated with the style. Therefore, dual-screen display control unit 200, when it is detected that a degree of opening of main body 40 is in a first style state, causes an app image for a first app associated with the first style state (in other words, a style indicated by the first style state) to appear on first screen 11.

In a case where style condition detecting unit 100 outputs a detection result indicative of the notebook PC style, first display control unit 201 causes an app image for the document creation app associated with the notebook PC style to appear on first screen 11, and second display control unit 202 causes an app image for the keyboard app associated with the notebook PC style to appear on second screen 21. A first style state and a second style state that together indicate a style are associated with information (for example, an app shown in FIG. 6) associated with the style.

Therefore, dual-screen display control unit 200, when it is detected that a degree of opening of main body 40 is in a first style state and that a tilt of main body is in a second style state, causes an app image for a first app associated with the style states (in other words, a style indicated by the first style state and the second style state) to appear on first screen 11, and causes an app image for a second app associated with the style states to appear on second screen 21.

A first app whose image is shown on first screen 11 is an example of a "first application" of the present invention, a second app whose image is shown on second screen 21 is a "second application" of the present invention. After dual-screen display control unit 200 completes displaying an app image for an app associated with a style state(s), the unit notifies style-based processing execution unit 300 of the completion.

Style-based processing execution unit 300 performs processing associated with a style state(s) by use of an app whose image is shown on a display. Style-based processing execution unit 300 stores an application processing table in which a style is associated with processing of a first app (first app processing) to be performed and processing of a second app (second app processing) to be performed.

FIG. 7 shows an example of the application processing table, in which the "fully open style" is associated with first app processing "double-screen full display" and second app processing "none." The double-screen full display refers to causing, using an OS function, an app image for an app to appear on an entire large screen including first screen 11 and second screen 21. The second app processing "none" means that there is no processing to be performed.

The "fully closed style" and the "notebook PC style" are associated with no processing. The "tent style" is associated with first app processing "replay start" and second app processing "replay start." The "vertical style" is associated with first app processing "shooting start" and second app processing "measurement start." Style-based processing execution unit 300, in a case where style condition detecting unit 100 provides the unit 300 with a detection result indicative of the fully open style, and dual-screen display control unit 200 notifies the unit 300 of completion of display of the book viewing app on first screen 11, performs first app processing to cause, using the OS function, an app image for the book viewing app to appear on the entire double-screen.

The fully open style is associated with no second app processing; therefore, style-based processing execution unit 300 performs no processing by use of an app whose image is shown on second screen 21. As shown by this example, in a case where only a first style state indicates a style, style-based processing execution unit 300, in response to detection that a degree of opening of main body 40 is in a first style state, and to display of an app image for a first app, performs processing associated with the first style state by use of the first app.

Alternatively, style-based processing execution unit 300, in a case where style condition detecting unit 100 provides the unit 300 with a detection result indicative of the tent style, and dual-screen display control unit 200 notifies the unit 300 of completion of display of the movie replay app on each of first screen 11 and second screen 21, performs first and second app processing of replaying a movie by use of functions of the movie replay app.

As shown by this example, in a case where a first style state and a second style state indicate a style, style-based processing execution unit 300, in response to detection that a degree of opening of main body 40 is in a first style state and that a tilt of main body 40 is in a second style state, and to display of images of a first app and a second app, performs first app processing and second app processing associated with the style states by use of the first and second apps.

Smartphone 1 having the configuration described in the foregoing performs style-based display processing for displaying an app image in accordance with a style of the device.

Figure 8:
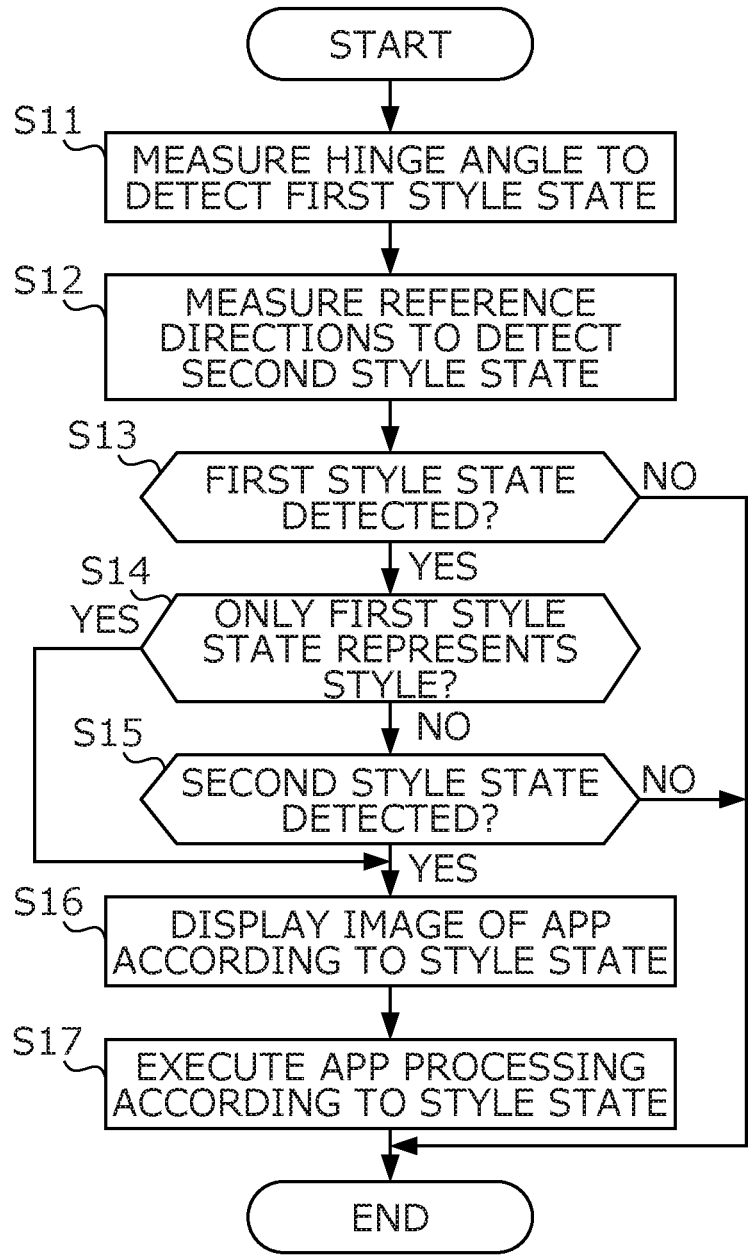
FIG. 8 is a diagram showing an example of a procedure of style-based display processing, in accordance to the present invention.

FIG. 8 shows an example of a procedure of the style-based display processing.

The processing shown in the drawing starts when smartphone 1 is powered on, and runs at predetermined time intervals (for example, every 0.5 seconds).

Initially, smartphone 1 (main body degree of opening detecting unit 101) measures a hinge angle to detect that a degree of opening of main body 40 is in a first style state (step S11). Subsequently, smartphone 1 (main body tilt detecting unit 102) measures reference directions A1 and A2 to detect that a tilt of main body 40 is in a second style state (step S12).

Subsequently, smartphone 1 (dual-screen display control unit 200) determines whether a degree of opening of main body 40 is in a first style state (step S13). When smartphone 1 determines that the degree of opening is not in a first style state (NO), the present processing ends. When smartphone 1 (dual-screen display control unit 200) determines at step S13 that the degree of opening is in a first style state (YES), smartphone 1 determines whether only the first style state indicates a style (step S14).

When smartphone 1 (dual-screen display control unit 200) determines at step S14 that only the first style state does not indicate a style (NO), smartphone 1 further determines whether it is detected that a tilt of main body 40 is in a second style state (step S15). When smartphone 1 (dual-screen display control unit 200) determines at step S15 that it is not detected that a tilt of main body 40 is in a second style state (NO), the present processing ends.

When smartphone 1 (dual-screen display control unit 200) determines at step S15 that it is detected that a tilt of main body 40 is in a second style state (YES), or determines at step S14 that only the first style state indicates a style (YES), smartphone 1 causes an app image for an app corresponding to the detected style state(s) to appear on one or both of first screen 11 and second screen 21 (step S16). Subsequently, smartphone 1 (style-based processing execution unit 300) performs app processing corresponding to the detected style state(s) (step S17). After that, the present processing ends.

In the present embodiment, smartphone 1, which is a dual-screen foldable display device, is enabled to detect a degree of opening (a first style state) of main body 40 indicative of a particular style such as the fully open style or the fully closed style, and to display an app image for an app associated with a detected first style state. Smartphone 1 can make a particular app associated with a style usable more quickly than a smartphone that requires not only a change of shape into a particular style but also an input operation to display an app image.

Also, in the present embodiment, detection of a degree of opening (a first style state) and a tilt (a second style state) of main body 40, which indicate a particular style such as the notebook PC style, the tent style, or the vertical style, gives rise to display of an app image for an app associated with the style states. A combination of two style states makes it possible to increase types of apps that are made usable quickly, as compared with a case where only a first style state is used.

Further, in the present embodiment, after an app image for an app associated with a detected first style state is displayed, application processing associated with the first style state is performed. This procedure obviates the need for a user to request execution of processing that is usually performed first for a particular app.

The above embodiment is merely an example of embodiments of the present invention. The above embodiment may be modified as described below.

Apps associated style states are not limited to those shown in FIG. 6. For example, the fully open style may be associated with the browser, as a first app, and the map app, as a second app.

In such a case, when it is detected that a degree of opening of main body 40 is in a first style state, dual-screen display control unit 200 causes an app image for a second app (in this example, the map app) associated with the first style state to appear on second screen 21. This modification makes it possible to make two apps, which are usually used at the same time, usable quickly.

A situation is assumed that an app image for an app is already shown on first screen 11 or second screen 21 in accordance with a user's operation. For example, in a case where an app image is shown on second screen 21, dual-screen display control unit 200, in response to detection that a degree of opening of main body 40 is in a first style state, may cause an app image for a first app associated with the first style state and the app to appear on first screen 11.

In a case where an app image is shown on first screen 11, dual-screen display control unit 200 causes an app image for a second app associated with the first style state and the app to appear on second screen 21. When a second style state is detected in addition to the first style state, dual-screen display control unit 200 causes an app image for a first or second app associated with the first style state, the second style state, and the app being shown, to appear.

Dual-screen display control unit 200 pre-stores an application-to-display table in which a style is associated with an app shown on one of the screens, and an app to be shown on the other screen.

FIG. 9 shows an example of the application-to-display table of the present modification, in which the "fully open style" is associated with a displayed app, "telephone directory app" and a to-be-displayed app, "telephone app."

The "notebook PC style" is associated with a displayed app, "music performance app" and a to-be-displayed app, "musical score display app." For example, when a first style state indicative of the fully open style is detected while the telephone directory app is shown on second screen 21, dual-screen display control unit 200 causes the telephone app associated with the fully open style and the telephone directory app to appear on first screen 11.

In another example, when first and second style states indicative of the notebook PC style are detected while the music performance app is shown on first screen 11, dual-screen display control unit 200 causes the musical score display app associated with the notebook PC style and the music performance app to appear on second screen 21. The application-to-display table shown in FIG. 9 makes it possible to make an app, which is usually used together with a displayed app, usable quickly.

Style states are not limited to those defined in the above embodiment. Any one of the hinge angles each indicative of a style state may be changed. For example, the first style state indicative of the fully open style may be changed from 180 degrees to 170 or 175 degrees. An allowable margin of an angle for any one of the style states may be changed. For example, an allowable margin of an angle may be changed from plus or minus 10 degrees to plus or minus 5 or 15 degrees.

Styles of the smartphone are not limited to those defined in the above embodiment. The fully open style may be divided into two styles: a placed-on-floor style in which reference direction A1 is directed vertically upward, and a hand-held style in which reference direction A1 is directed vertically upward relative to the horizontal direction.

The fully closed style may be divided into two styles: a vertically held style in which reference direction A2 is directed substantially vertically upward, and a horizontally held style in which reference direction A2 is directed horizontally. For any style that has a specific set of a degree of opening and a tilt of main body 40, and has a corresponding frequently used app, display processing of dual-screen display control unit 200 and app processing of style-based processing execution unit 300 make it possible to make a particular app usable quickly to obviate the need for a user to request app processing.

Dual-screen display control unit 200 may determine an app to be displayed, based on not only a style but also a time period. To do so, dual-screen display control unit 200 stores an application-to-display table in which a style is associated with a time period, a first app, and a second app.

FIG. 10 shows an example of the application-to-display table of the present modification, in which the "fully open style" is associated with a time period, "breakfast time," a first app, "newspaper viewing app," and a second app, "weather forecast app," and is also associated with a time period, "pre-dinner time," a first app, "store search app," and a second app, "map app."

For example, when the first style state indicative of the fully open style is detected during a breakfast time, dual-screen display control unit 200 causes the newspaper viewing app associated with the style and the time period to appear on first screen 11, and causes the weather forecast app associated with the style and the time period to appear on second screen 21. When the detection is made during a pre-dinner time, dual-screen display control unit 200 causes the store search app associated with the style and the time period to appear on first screen 11, and causes the map app associated with the style and the time period to appear on second screen 21.

In this case, when it is detected that a degree of opening of main body 40 is in the first style state, dual-screen display control unit 200 causes an app image for a first app associated with the first style state and a time period including the current time to appear on first screen 11 and second screen 21. The "tent style" is associated with a time period, "breakfast time," a first app, "TV app," and a second app, "TV app," and is also associated with a time period, "weekend daytime," a first app, "streaming-video viewing app," and a second app, "streaming-video viewing app."

When the first and second style states indicative of the tent style are detected during a breakfast time, dual-screen display control unit 200 causes the TV app associated with the style and the time period to appear on first screen 11 and second screen 21. When the detection is made during a weekend daytime, dual-screen display control unit 200 causes the streaming-video viewing app associated with the style and the time period to appear on first screen 11 and second screen 21.

In this case, when it is detected that a degree of opening of main body 40 is in the first style state, and that a tilt of main body 40 is in the second style state, dual-screen display control unit 200 causes images of first and second apps associated with the first style state, the second style state, and a time period including a current time to appear on first screen 11 and second screen 21. The application-to-display table shown in FIG. 10 makes it possible to make an app, which is usually used during the time period, usable quickly during a particular time period.

In the present modification, style-based processing execution unit 300, in response to detection that a degree of opening of main body 40 is in a first style state, and to display of an app image for a first app, may perform processing associated with the first style state and a current time period by use of the first app. For example, when the fully open style is detected during a breakfast time, and the newspaper viewing app is displayed as a first app, style-based processing execution unit 300 may perform processing for causing the first app to appear on the entire double-screen, instead of causing a second app to appear.

When the tent style is detected during a breakfast time, and the TV app is displayed as first and second apps, style-based processing execution unit 300 may perform processing for switching to a preset user's favorite channel. This procedure obviates the need for a user to request execution of processing that is usually performed first for a particular app that is usually used during a particular time period.

Dual-screen display control unit 200 may determine an app to be displayed, based on not only a style but also a current position of the smartphone. In the present modification, sensors 8 shown in FIG. 2 include a sensor for measuring a position such as a global positioning system (GPS) receiver. Sensors 8 are an example of a "measurement unit" of the present invention. Dual-screen display control unit 200 stores a current position table in which a position measured by sensors 8 is associated with a position of an office, a home, a downtown area, or a mountain trail.

Dual-screen display control unit 200 also stores an application-to-display table in which a style is associated with a position, a first app, and a second app.

FIG. 11 shows an example of the application-to-display table of the present modification, in which the "fully open style" is associated with a position, "downtown area," a first app, "store search app," and a second app, "map app," and is also associated with a position, "mountain trail," a first app, "mountain trail map app," and a second app, "mountain weather app."

For example, when the first style state indicative of the fully open style is detected, and a current position measured by sensors 8 is included in the downtown area registered in the current position table, dual-screen display control unit 200 causes the store search app associated with the style and the current position to appear on first screen 11, and causes the map app associated with the style and the current position to appear on second screen 21. When the detection is made, and the measured current position is included in the mountain trail area, dual-screen display control unit 200 causes the mountain trail map app associated with the style and the current position to appear on first screen 11, and causes the mountain weather app associated with the style and the current position to appear on second screen 21.

In this case, when it is detected that a degree of opening of main body 40 is in the first style state, dual-screen display control unit 200 causes an app image for a first app associated with the first style state and the measured current position to appear on first screen 11 and second screen 21. The "tent style" is associated with a position, "office," a first app, "note app," and a second app, "presentation app," and is also associated with a position, "home," a first app, "movie replay app," and a second app, "movie replay app."

When the first and second style states indicative of the tent style are detected, and a current position is included in the office, dual-screen display control unit 200 causes the note app associated with the style and the current position to appear on first screen 11, and causes the presentation app associated with the style and the current position to appear on second screen 21. When the detection is made, and the current position is included in the home, dual-screen display control unit 200 causes the video replay app associated with the style and the current position to appear on first screen 11 and second screen 21.

In this case, when it is detected that a degree of opening of main body 40 is in the first style state, and that a tilt of main body 40 is in the second style state, dual-screen display control unit 200 causes images of first and second apps associated with the first style state, the second style state, and a current position to appear on first screen 11 and second screen 21. The application-to-display table shown in FIG. 11 makes it possible to make an app, which is usually used at a particular place, usable quickly at that place.

In the present modification, style-based processing execution unit 300, in response to detection of a first style state, and to display of an app image for a first app, may perform first app processing associated with the first style state and a current position by use of the first app. In a case where the application-to-display table shown in FIG. 11 is used, style-based processing execution unit 300 performs processing for displaying a map of an area including a current position by use of the mountain trail map app, and processing for displaying a weather of the area by use of the mountain weather app.

Style-based processing execution unit 300, after detection of a first style state and a second style state triggers display of an app image for a first (or second) app, may perform first (or second) app processing associated with the first style state, the second style state, and a current position by use of the first (or second) app.

In a case where the application-to-display table shown in FIG. 11 is used, style-based processing execution unit 300 performs processing for starting a slide show by use of the presentation app, and processing for replaying a movie from where a user left off by use of the movie replay app. This procedure obviates the need for a user to request execution of processing that is usually performed first for a particular app that is usually used at a particular place.

In the above embodiment, a first app, a second app, first app processing, and second app processing are pre-determined; however, they may be set by a user for use by style condition detecting unit 100. Alternatively, style condition detecting unit 100 may refer to a user's app usage history to set frequently used apps (for example, an app that has been used most frequently during a certain period) as a first app and a second app. Alternatively, style-based processing execution unit 300 may refer to a user's app usage history to set frequently used processing as first app processing and second app processing. Either of them makes it possible to display a desired app and perform app processing.

A tilt of main body 40 may be represented in a manner different from that of the above embodiment. For example, the number of reference directions may be reduced to one. If only reference direction A1 is used, a direction in which first screen 11 faces represents a tilt of main body 40, and if only reference direction A2 is used, a direction at which a vertical direction (a direction along the longer side) of first screen 11 is directed represents a tilt of main body 40.

Alternatively, reference directions different from those of the above embodiment may be used. For example, a direction along the shorter side of first screen 11, or a normal direction of second screen 21 may be used. In short, any reference direction may be used that indicates in which direction a front direction (a direction of a normal) and a vertical direction (the longitudinal direction) of at least one of first screen 11 and second screen 21 are directed.

In the above embodiment, hinge 30 of smartphone 1 connects first body 10 and second body 20 so that they can rotate, and the hinge angle changes from 0 degree to 360 degrees. The hinge angle may change within a predetermined range between 0 degree and 360 degrees. In the above embodiment, hinge 30 connects first body 10 and second body 20 such that first screen 11 and second screen 21 face outward at a hinge angle of 0 degree. Instead of this, hinge 30 may connect first body 10 and second body 20 such that first screen 11 and second screen 21 face inward at a hinge angle of 0 degree.

The present invention can be applied not only to a smartphone but also to, for example, a tablet device. The present invention can be applied to a dual-screen display device that can provide the functions shown in FIG. 4. The present invention can be implemented, instead of as such a display device, as an information-processing method for causing the display device to perform processing, or as a program for causing a computer to control the display device. The program may be provided in the form of a recording medium such as an optical disk. Alternatively, the program may be downloaded to and installed in a computer via a network such the Internet.

The order of the processes, sequence, or flowcharts in the embodiments described in the present specification may be changed as long as consistency is maintained. Methods described in the present specification include steps arranged in an exemplary order, but the steps may be arranged in another order.

Input or output information may be stored in a location such as memory, or may be managed in a management table. Input or output information may be overwritten, updated, or additionally written. Output information may be deleted. Input information may be sent to another device.

Software should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is referred to as software, firmware, middleware, microcode, hardware description language, or by any other name.

Software and instructions may be sent and received via a transmission medium. For example, software may be sent from a website, a server, or another remote source, using a wired medium such as a coaxial cable, a fiber optic cable, a twisted pair, or a digital subscriber line (DSL), and/or a wireless medium such as infrared, wireless, or microwave. The wired medium and the wireless medium are included within the definition of a transmission medium.

Information and signals described in the present specification may be represented using any of various technologies. For example, data, instructions, commands, information, signals, bits, symbols, and chips that are described in the foregoing, may be represented by voltages, currents, electromagnetic waves, magnetic fields or particles, optical fields or photons, or any combination thereof.

The description "based on" used in the present specification does not mean "based only on," unless explicitly stated otherwise. In other words, the description "based on" means both "based only on" and "based at least on."

In a description "A and B" or "A or B" appearing in the present specification, the conjunction "and" or "or" may be interchanged with the other as long as it does not cause inconsistency with the other descriptions.

The embodiments described in the present specification may be used separately or in combination, with minor changes. A notification of information (for example, a notification of "being X") may be made explicitly or implicitly.

The present invention is described in detail in the foregoing; however, it is apparent to those ordinarily skilled in the art that the present invention is not limited to the embodiments described in the present specification. The present invention may be implemented in modified or changed embodiments, without departing from the spirit and scope of the present invention defined by the description of the claims. The description in the present specification is for illustrative purposes and is not intended to limit the present invention in any way.

What is claimed is:

1. A display device comprising:
a main body including a first body being plat-shaped including a first screen provided at a front side of the first body, opposite a back side of the first body, a second body being plate-shaped including a second screen provided at a front side of the second body, opposite a back side of the second body, and a connecting part that connects the first body and the second body to enable rotation of the first body and second body about the connecting part, wherein when the main body is in a fully-closed state, the back side of the first body is in contact with the back side of the second body;
a detection unit configured to detect at least a degree of opening of the main body, which defines a first state of the main body, and
a display control unit configured to determine and display a first application the first screen, based on the first state of the main body and a location of the display device.

2. The display device according to claim 1, wherein:
the detection unit is further configured to detect that a tilt of the main body which defines a second state of the main body; and
the display control unit is configured to determine and display a first application on the first screen, based on the first state of the main body, the second state of the main body and the location of the display device.

3. The display device according to claim 1, further comprising an execution unit configured to perform processing of the first application on the first screen, based on the first state of the main body and the location of the display device.

4. The display device according to claim 2, further comprising an execution unit configured to perform processing of the first application on the first screen, based on the first state of the main body, the second state of the main body and the location of the display device.

5. The display device according to claim 1, wherein the display control unit is further configured to determine and display a second application on the second screen, based on the first state of the main body and the location of the display device.

6. The display device according to claim 2, wherein the display control unit is further configured to determine and display a second application on the second screen, based on the first state of the main body, the second state of the main body and the location of the display device.

7. The display device according to claim 1, wherein the display control unit is configured to determine and display the first application on the first screen, based on the first state of the main body, a second application displayed on the second screen and the location of the display device.

8. The display device according to claim 2, wherein the display control unit is configured to determine and display the first application on the first screen, based on the first state of the main body, the second state of the main body, a second application displayed on the second screen and the location of the display device.

9. The display device according to claim 1, wherein the display control unit is configured to determine and display the first application on the first screen, based on the first state of the main body, the location of the display device and a time.

10. The display device according to claim 2, wherein the display control unit is configured to determine and display the first application on the first screen, based on the first state of the main body, the second state of the main body, the location of the display device and a time.

11. The display device according to claim 1, further comprising a measurement unit configured to measure the location of the display device.

12. The display device according to claim 11, where in the measurement unit comprising a sensor including a global positioning receiver for measuring the location of the display device.

13. The display device according to claim 1, wherein the first state includes at least any one of a fully-open state, the fully-closed state, a notebook PC state, a tent state, and a vertical state.

14. The display device according to claim 1, wherein the display control unit is further configured to determine and display a first application on the first screen, based on the first state of the main body and a location of the display device, according to an application-to-display table.

15. A display method for a display device, the display method comprising:
detecting at least that a degree of opening of a main body of the display device, which defines a first state, the main body including a first body being plate-shaped including a first screen provided at a front side of the first body, opposite a back side of the first body, a second body being plate-shaped including a second screen provided at a front side of the second body, opposite a back side of the second body, and a connecting part that connects the first body and the second body to enable rotation of the first body and second body about the connecting part, wherein when the main body is in a fully-closed state, the back side of the first body is in contact with the back side of the second body; and
determining and displaying a first application on the first screen, based on the first state of the main body and a location of the display device.

16. A display device comprising:
a main body including a first body being plate-shaped including a first screen provided at a front side of the first body, opposite a back side of the first body, a second body being plate-shaped including a second screen provided at a front side of the second body, opposite a back side of the second body, and a connecting part that connects the first body and the second body to enable rotation of the first body and second body about the connecting part, wherein when the main body is in a fully-closed state, the back side of the first body is in contact with the back side of the second body;
a detection unit configured to detect at least a degree of opening of the main body, which defines a first state of the main body; and
a display control unit configured to determine and display a first application on the first screen, based on the first state of the main body and a time.

17. The display device according to claim 16, wherein the time includes at least one of a current time and a time period.

18. The display device according to claim 16, wherein:
the detection unit is further configured to detect that a tilt of the main body which defines a second state of the main body; and
the display control unit is configured to determine and display a first application on the first screen, based on the first state of the main body, the second state of the main body and the time.

19. The display device according to claim 16, wherein the display control unit is further configured to determine and display a second application on the second screen, based on the first state of the main body and the time.

20. The display device according to claim 16, wherein the display control unit is configured to determine and display the first application on the first screen, based on the first state of the main body, a second application displayed on the second screen and the time.

21. The display device according to claim 16, wherein the display control unit is further configured to determine and display a first application on the first screen, based on the first state of the main body and the time, according to an application-to-display table.

22. A display method for a display device, the display method comprising:
detecting at least that a degree of opening of a main body of the display device, which defines a first state, the main body including a first body being plate-shaped including a first screen provided at a front side of the first body, opposite a back side of the first body, a second body being plate-shaped including a second screen provided at a front side of the second body, opposite a back side of the second body, and a connecting part that connects the first body and the second body to enable rotation of the first body and second body about the connecting part, wherein when the main body is in a fully-closed state, the back side of the first body is in contact with the back side of the second body; and
determining and displaying a first application on the first screen, based on the first state of the main body and a time.

* * * * *

UNITED STATES PATENT AND TRADEMARK OFFICE
CERTIFICATE OF CORRECTION

PATENT NO. : 11,307,616 B2
APPLICATION NO. : 16/652085
DATED : April 19, 2022
INVENTOR(S) : Takurou Itou It is certified that error appears in the above-identified patent and that said Letters Patent is hereby corrected as shown below:

In the Claims

Column 15, Line 15, replace "plat-shaped" with "plate-shaped";

Column 15, Line 31, add the word "on" after "application"; and

Column 16, Line 17, replace "where in" with "wherein".

Signed and Sealed this
Thirty-first Day of May, 2022

*Katherine Kelly Vidal*

Katherine Kelly Vidal
*Director of the United States Patent and Trademark Office*